United States Patent
Zakrzewski et al.

(10) Patent No.: US 6,539,081 B2
(45) Date of Patent: Mar. 25, 2003

(54) METHOD OF ESTABLISHING SIGNALING RATE FOR SINGLE-LINE DIGITAL SUBSCRIBER LINK PROVIDING EXTENDED RANGE ADSL SERVICE WITH AUXILIARY POTS CHANNEL

(75) Inventors: Jon Thomas Zakrzewski, Huntsville, AL (US); Robert Allen Barrett, Madison, AL (US); Thomas L. Ballard, III, Madison, AL (US); John B. Wilkes, Jr., Harvest, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/910,699

(22) Filed: Jul. 20, 2001

(65) Prior Publication Data

US 2003/0016797 A1 Jan. 23, 2003

(51) Int. Cl.⁷ .............................................. H04M 11/00
(52) U.S. Cl. ............................. 379/93.32; 379/93.33; 379/93.28; 375/222
(58) Field of Search .................... 379/93.32, 93.33, 379/93.28, 90.01, 93.01, 93.05, 93.08, 93.09; 375/222, 225

(56) References Cited

U.S. PATENT DOCUMENTS

| | | | |
|---|---|---|---|
| 4,756,007 A | 7/1988 | Qureshi et al. ............... 375/37 |
| 4,890,316 A | 12/1989 | Walsh et al. ................... 379/98 |
| 4,924,456 A | 5/1990 | Maxwell et al. ............... 370/32 |
| 4,991,184 A | 2/1991 | Hashimoto .................... 375/8 |
| 5,048,054 A | 9/1991 | Eyuboglu et al. ............... 375/8 |
| 5,726,765 A | * 3/1998 | Yoshida et al. ........... 379/93.33 |
| 5,751,796 A | 5/1998 | Scott et al. ............... 379/93.31 |
| 5,898,761 A | * 4/1999 | McHale et al. .......... 379/93.01 |
| 6,091,766 A | 7/2000 | Yoshida ..................... 375/231 |
| 6,167,034 A | 12/2000 | Langberg et al. ........... 370/281 |

OTHER PUBLICATIONS

Bremer et al. ; Performance Custmization . . . xDSL Performane; Dec. 30, 1998; WO 98/59426.*

* cited by examiner

Primary Examiner—Melur Ramakrishnaiah
(74) Attorney, Agent, or Firm—Allen, Dyer, Doppelt, Milbrath & Gilchrist, P.A.

(57) ABSTRACT

An autobaud mechanism is executed by transceivers coupled to opposite ends of a communication loop, such as an extended range SDSL loop, to resolve the maximum data rate that can be supported by the loop, using signal power and quality measurements to first estimate the length of the SDSL loop and thereafter iteratively adjust baud rate and/or number of bits/per baud, as necessary, to realize an SDSL baud rate that will ensure error-free transmission over the loop.

12 Claims, 6 Drawing Sheets

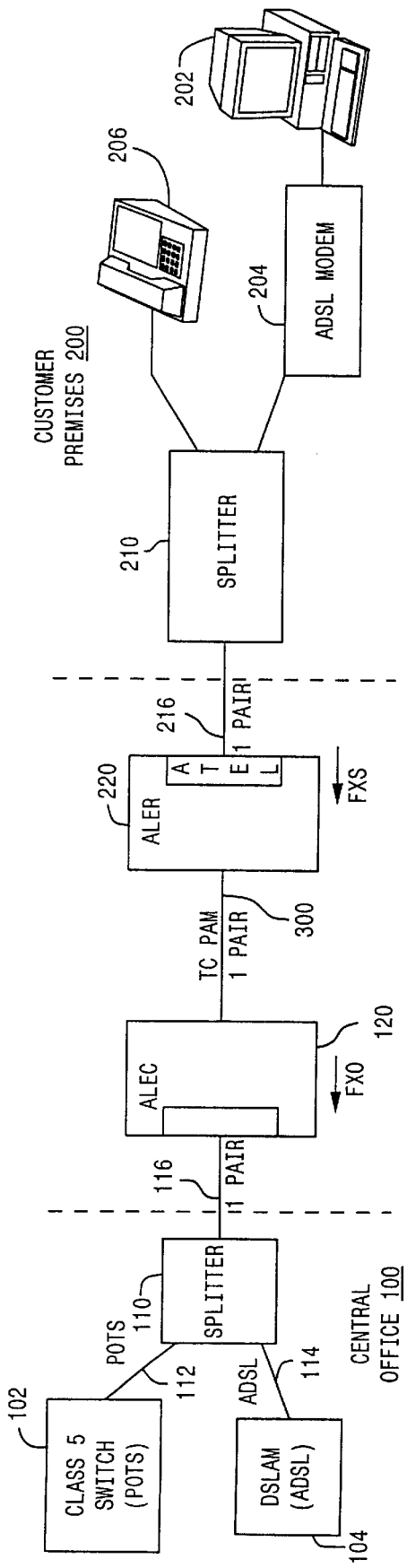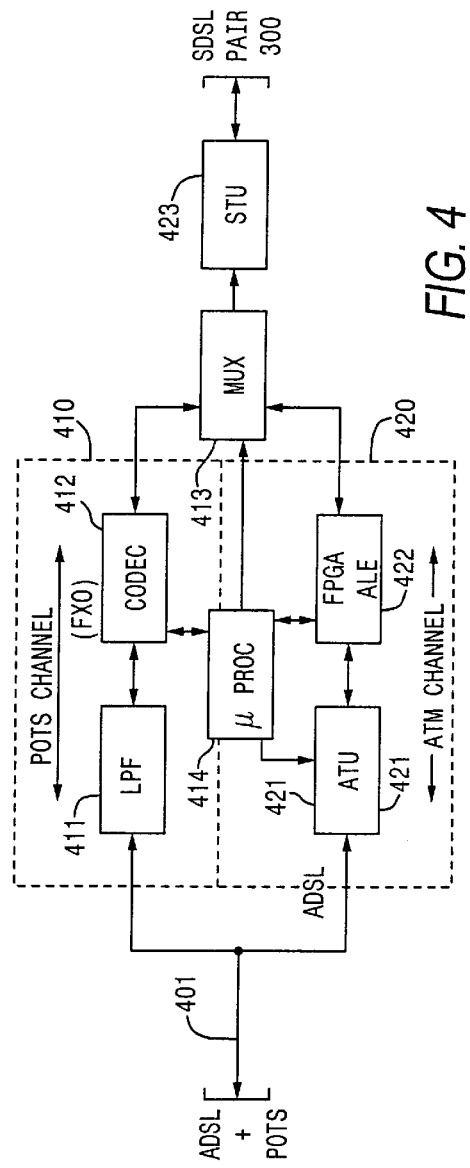
FIG. 3
FIG. 4

METHOD OF ESTABLISHING SIGNALING RATE FOR SINGLE-LINE DIGITAL SUBSCRIBER LINK PROVIDING EXTENDED RANGE ADSL SERVICE WITH AUXILIARY POTS CHANNEL

CROSS-REFERENCE TO RELATED APPLICATIONS

The present invention relates to subject matter disclosed in U.S. patent application, Ser. No. 09/910,707 (hereinafter referred to as the 707 application), filed coincident herewith, by K. Schneider et al, entitled: "SYSTEM FOR PROVIDING EXTENDED RANGE ADSL SERVICE WITH AUXILIARY POTS CHANNEL OVER SINGLE-LINE DIGITAL SUBSCRIBER LINK," and also U.S. patent application, Ser. No. 09/910,146 (hereinafter referred to as the '146 application), filed coincident herewith, by T. Ballard et al, entitled: "METHOD OF INDUCING ADSL COMMUNICATION DEVICE TO TRANSMIT AT DOWNSTREAM SIGNALING RATE OPTIMIZED FOR EXTENDED RANGE ADSL SERVICE WITH AUXILIARY POTS CHANNEL OVER SDSL LINK," each application being assigned to the assignee of the present application and the disclosures of which are incorporated herein.

FIELD OF THE INVENTION

The present invention relates in general to telecommunication systems and networks, and particularly to a mechanism for automatically resolving the signaling rate that can be supported by a communication link, such as, but not limited to a single-line digital subscriber link of the type described in the above-referenced '707 application for providing extended range asymmetric digital subscriber line (ADSL) service together with an auxiliary plain old telephone service (POTS) channel.

BACKGROUND OF THE INVENTION

As described in the above-referenced co-pending applications, the ability to conduct high-speed data communications between remotely separated data processing systems and associated subsystems and components has become a requirement of a variety of industries and applications such as business, educational, medical, financial and personal computer uses, and it can be expected that current and future applications of such communications will continue to engender more systems and services in this technology.

Associated with such applications has been the growing use and popularity of the "Internet", which continues to stimulate research and development of advanced data communications systems between remotely located computers, especially communications capable of achieving relatively high-speed data rates over an existing signal transport infrastructure (e.g., legacy copper cable plant).

One technology that has gained particular interest in the telecommunication community is digital subscriber line (DSL) service, which enables a public service telephone network (PSTN), to deliver (over limited distances) relatively high data bandwidth using conventional telephone company copper wiring infrastructure. DSL service has been categorized into several different technologies, based upon expected data transmission rate, the type and length of data transport medium, and schemes for encoding and decoding data.

Regardless of its application, the general architecture of a DSL system essentially corresponds to that diagrammatically shown in FIG. 1, wherein a pair of remotely separated mutually compatible digital communication transceivers are coupled to a communication link, such as a twisted pair of an existing copper plant. One of these transceivers, denoted as a 'west site' DSL transceiver 11, is typically located in a digital subscriber line access multiplexer (DSLAM) 12 at a network controller site 13 (such as a telephone company central office (CO)). The other transceiver, denoted as an 'east site' DSL modem 21, may be coupled with a computer 22 located at a customer premises 23, such as a home or office.

Within the communication infrastructure of the telephone company, the 'west site' DSLAM 12 is coupled with an associated network 'backbone' 15, which communicates with various information sources 31 and the Internet 33. This telecommunication fabric thus allows information, such as Internet-sourced data (which is readily accessible via the backbone network 15), to be transmitted from the central office DSL transceiver 11 over the communication link 10 to the compatible DSL transceiver 21 at the customer site 23.

In a DSL system of the type described above, the data rates between DSL transceivers are considerably greater than those for voice modems. For example, while voice modems typically operate at voice frequency band, from DC up to a frequency on the order of 4 KHz (with data rates around 28 Kbps), DSL data transceivers may operate in a bandwidth between 25 KHz to well over 1 Mbps, with data rates typically greater than 200 Kbps and up to 50 Mbps (as in the case of a Very-high-data-rate Digital Subscriber Line (VDSL)). This voice/data bandwidth separation allows high-speed data transmissions to be frequency division multiplexed with a separate voice signal over a common signal transport path.

Moreover, the high-speed frequency band used for ADSL data communications may be 'asymmetrically' subdivided or separated (as per (1998) ANSI standard T.413) as shown in FIG. 2, to allocate a larger (and higher frequency) portion of the available spectrum for 'downstream' (west-to-east in FIG. 1) data transmissions from the central office site to the customer site, than data transmissions in the 'upstream' direction (east-to-west in FIG. 1) from the customer site to the central office.

As a non-limiting example, for the case of a single twisted copper pair, a bandwidth on the order of 25 KHz to 125 KHz may be used for upstream data transmissions, while a considerably wider bandwidth on the order of 130 KHz to 1.2 MHz may be used for downstream data transmissions. This asymmetrical downstream vs. upstream allocation of ADSL data bandwidth is based upon the fact that the amount of data transported from the central office to the customer (such as downloading relatively large blocks of data from the Internet) can be expected to be considerably larger than the amount of information (typically e-mail) that users will be uploading to the Internet.

Fortunately, this relatively wide separation of the upstream and downstream frequency bands facilitates filtering and cancellation of noise effects, such as echoes, by relatively simple bandpass filtering techniques. For example, an upstream echo of a downstream data transmission will be at the higher (downstream) frequency, when received at the central office, so as to enable the echo to be easily filtered from the lower (upstream) frequency signal. Frequency division multiplexing also facilitates filtering of near-end crosstalk (NEXT), in much the same manner as echo cancellation.

In addition to ADSL, there are a number of other DSL technologies, such as High-Bit-Rate Digital Subscriber Line (HDSL), Symmetric Digital Subscriber Line (SDSL), and Very-high-data-rate Digital Subscriber Line (VDSL). Also, HDSL2 (ANSI Standard T.418 (2000)) uses one twisted pair for full duplex 1.544 Mbps payload delivery up to a distance on the order of 18 kft.

Among these, HDSL, unlike ADSL described above, has a symmetric data transfer rate—communicating at the same speed in both upstream and downstream directions. Currently perceived data rates for HDSL are on the order of 1.544 Mbps of bandwidth; however HDSL requires more signal transport infrastructure—two copper twisted pairs. In addition, the operating range of HDSL is more limited than that of ADSL, and is currently considered to be effective at distances of up to approximately 12,000 feet or less, beyond which signal repeaters are required.

SDSL (which is described in ITU standards publications) delivers symmetric data transfer speed that is comparable to HDSL2; however, as pointed out above, it employs only a single twisted copper pair; consequently, its range is currently limited to approximately 10,000 feet. SDSL rates are dependent upon line characteristics, such as wire gauge, bridge taps, etc. SDSL may employ rates greater than HDSL2 on short twisted pairs. VDSL provides asymmetric data transfer rates at considerably higher speeds, e.g., on the order of 13 Mbps to 52 Mbps downstream, and 1.5 Mbps to 2.3 Mbps upstream, which severely limits its range (e.g., 1,000 to 4,500 feet).

In addition to performance considerations and distance limitations for transporting DSL communications over a conventional twisted-pair infrastructure, the cost of the communication hardware is also a significant factor in the choice of what type of system to deploy. In this regard, a lower data rate DSL implementation may offer high-speed data communications, for example, at downstream data rates on the order of or exceeding 1 Mbps over an existing twisted-pair network and at a cost competitive with conventional non-DSL components, such as V.34, V.90, and ISDN modems (e.g., 28.8 Kbps to 128 Kbps). ISDN is occasionally referred to as IDSL and is sometimes considered as a DSL technology. Still, many telecom service providers currently desire to deliver relatively low cost (repeaterless) ADSL service over extended distances (e.g., on the order of 25 kft) Hence, there is a need for an ADSL line extender.

Pursuant to the invention described in the above-referenced '707 application, this objective is achieved by inserting, between the central office and remote nodes of an existing ADSL infrastructure, a hybrid SDSL-ADSL range-extending data/POTS communication scheme shown diagrammatically in FIG. 3. Like the ADSL system of FIG. 1, the ADSL range extending'scheme of FIG. 3 contains a pair of remotely separated (relatively 'upstream' and 'downstream') communication sites 100 and 200 that communicate with one another over a link 300. In the system of FIG. 3, this link is an SDSL link. By virtue of the communication range-extending functionality of the system of FIG. 3, the length of the inter site link 300 may be on the order of up to 25 kft, which is considerably greater than the customary maximum 10–12 kft distance for conventional ADSL applications.

The upstream (or network-associated) site 100 may correspond to a telephone network controller site, such as a telephone company (telecom) central office, containing a central office switch (such as a conventional AT&T 5ESS switch) 102, through which POTS service is customarily provided. The network site also contains auxiliary digital communication equipment (such as a DSLAM) 104, which provides backbone communications via a channel service unit (CSU), that is coupled by way of a fiber optic line or DS3 transporting copper plant with additional information sources and the Internet.

The Internet service provider (ISP) may be at another location, operated separately from the central office. On the other hand, if the telephone service provider operating the central office equipment also provides Internet access, the ISP may correspond to a separate function within the central office proper or elsewhere in its network. The auxiliary equipment is typically provided relatively close to the central office (often within the same installation as the central office switch). This relatively short distance readily enables high-speed data communications using ADSL protocol by way of a two-wire pair 116 coupled between the DSLAM 104 and an ADSL Extender-C (Central Office) or 'ALE-C' 120 to be described.

Network site 100 also includes a splitter/combiner 110, which is coupled over an auxiliary signal (POTS link) 112 to the switch 102 and over an ADSL signal link 114 to the DSLAM 104. In the downstream direction, the splitter/combiner 110 combines the relatively low frequency POTS signal with the higher frequency ADSL signal for FDM transport over link 116 to the ALE-C 120. The ALE-C 120 comprises an ADSL Loop Extender architecture as shown in FIG. 4, to be described, and contains respective POTS and ADSL processing subsystems, and an associated TC PAM transceiver that serves as the communication interface with the SDSL path 300.

These subsystems process and interface the composite POTS and ADSL signals from the splitter/combiner 110 as a downstream multiplexed data stream over the SDSL link 300 to the customer site 200. They also interface an upstream multiplexed data stream received over the SDSL link 300 from the customer site 200 into a composite POTS and ADSL FDM signal for delivery over the link 116 to the splitter/combiner 110. In the upstream direction, the splitter/combiner 110 contains filter circuitry (such as a low pass filter installed a POTS path thereof) that separates an upstream-directed, low frequency POTS signal from the higher frequency ADSL signal within the FDM signal supplied from the ALE-C 120, for delivery to the switch 102 and the DSLAM 104, respectively.

The downstream (or customer-associated) site 200 may correspond to a customer premises, such as a home or office, and contains a computer 202 and an associated ADSL modem 204, plus a POTS telephone 206. Complementary to the network site 100, the customer site 200 contains a splitter/combiner 210, which is coupled over a POTS signal link 212 to the POTS phone 202, and over an ADSL signal link 214 to the ADSL modem 204. In the downstream direction, splitter/combiner 210 contains filter circuitry that splits the downstream POTS signal from the ADSL signal within the FDM (POTS and ADSL) signal, supplied over a two-wire pair 216 from an ADSL Loop Extender-R (Remote) or 'ALR-R'220, for delivery to POTS phone 206 and customer modem 204, respectively.

In the upstream direction, the splitter/combiner 210 combines the relatively low frequency POTS signal from the POTS phone 206 with the higher frequency ADSL signal from the ADSL modem 204 for FDM transport over the pair 216 to ALE-R 220. Like the ALE-C 120 of the network site 100, ALE-R 220 is comprised of an ADSL Loop Extender architecture as shown in FIG. 4. In the downstream direction, ALE R-220 interfaces a downstream multiplexed data stream received over the SDSL link 300 from the network site 100 into a composite FDM POTS and ADSL signal for delivery over the link 216 to the splitter/combiner 210. In the upstream direction, the ALE-R 220 interfaces a composite POTS and ADSL signal from the splitter/combiner 210 as an upstream multiplexed data stream for TC-PAM transmission over the SDSL link 300 to the network site 100.

FIG. 4 shows the architecture of a respective ADSL Loop Extender (ALE) that is installed at each of the network (central office (C)) site 100 and the customer (remote (R)) site 200 of the extended range communication system of FIG. 3. On the ADSL/POTS interface side, the ALE has an FDM port 401 coupled to a respective one of the twisted pairs 116 and 216. Port 401 is coupled to each of a POTS channel processing subsystem 410 and an ADSL channel processing subsystem 420. The POTS channel subsystem 410 includes a low pass filter (LP F) 411, having a bandpass characteristic associated with POTS voice frequencies, coupled in circuit with a ($\mu$-law) codec 412.

In the 'to the SDSL link' direction (towards the SDSL link 300), codec 412 is operative to perform $\mu$-law encoding of the filtered POTS signals applied to a multiplexer-demultiplexer (mux/demux) 413, under the control of a supervisory communications controller (microprocessor) 414. In the 'from the SDSL link' direction (from the SDSL link 300), codec 412 is operative to perform $\mu$-law based decoding of a received 64 Kbps POTS channel from the mux/demux 413. The ADSL channel subsystem 420 includes an asymmetric transceiver unit-remote (ATU) 421, that is coupled between the FDM port 401 and an ATM transceiver 422.

The ATM transceiver 422 contains of a cascaded arrangement of signal processing components (described below with reference to FIGS. 5 and 6), that perform a prescribed set of signal processing functions associated with reception, timing adjustment, and transmission of ATM cell-based ADSL data traffic, including framing, deframing, scrambling, descrambling, idle cell-insertion, etc. For ADSL communications in the 'to the SDSL link' direction, the ATM transceiver 422 supplies the mux/demux 413 with a modified ATM data stream containing (timing adjustment) idle cells that have been controllably inserted into the ATM cell data provided by the ATU 421, under the control of communications controller 414. In the 'from the SDSL link' direction, ATM transceiver 422 receives a similar rate-adjusted ATM data stream output by the mux/demux 413 for application to and processing by the ATU 421.

Mux/demux 413 is interfaced with the SDSL link 300 via a symmetric DSL transceiver unit (STU) 423. STU 423 is operative to perform TC-PAM based modulation of the output of a composite digitized POTS and data rate-adjusted ATM data stream provided by mux/demux 413 for application to SDSL link 300. It also performs TC-PAM demodulation of the output of the composite digitized POTS and data rate-adjusted ATM data stream received from the SDSL link 300. For a non-limiting example of documentation describing the architecture and range extension signal processing functionality of a TC-PAM based digital communication transceiver, attention may be directed to the U.S. Pat. No. 5,809,033 to M. Turner et al, entitled: "USE OF MODIFIED LINE ENCODING AND LOW SIGNAL-TO-NOISE RATIO BASED SIGNAL PROCESSING TO EXTEND RANGE OF DIGITAL DATA TRANSMISSION OVER REPEATERLESS TWO-WIRE TELEPHONE LINK," assigned to the assignee of the present application, and the disclosure of which is herein incorporated.

The signal processing functionality of a network (central office (C)) site ATM transceiver 422-C installed within the ALE-C 120 at the network site 100 is shown in the block diagram of FIG. 5, while that of a similar customer site ATM transceiver 422-R within the ALE-R 220 at the customer site 200 is shown in the block diagram of FIG. 6. While the signal processing architectures of ATM transceivers 422-C and 422-R are the same, each ATM transceiver will be described separately, as their respective operational (data rate) parameters are defined by the asymmetrical downlink and uplink communication properties of the link.

Considering first the network site ATM transceiver 422-C of FIG. 5, its signal flow path in the 'to the SDSL link' or downstream direction includes a cascaded arrangement of a CELLDELIN_ATM operator or block 431, an ATMFIFO_2CELL block 433, and a GENCELLS_ATM block 435. In the 'from the SDSL link', or upstream direction, the signal flow path through the ATM transceiver 422-C includes a cascaded arrangement of a CELLDELIN_ATM block 441, an ATMFIFO_2CELL block 443, and a GENCELLS_ATM block 445. Each of these blocks, preferably implemented in an FPGA, as described above, performs conventional signal processing functions to be described.

In the downstream path, the CELLDELIN_ATM block 431 is coupled to receive DSLAM-originated ATM traffic, as extracted by the ATU 421 from the composite FDM channel applied to the FDM port 401 from the two-wire path 116. The CELLDELIN_ATM block 431 deframes the serial ATM cells coming from the DSLAM 104, descrambles the deframed ATM cells and then writes them into the ATMFIFO_2CELL block 443. As its name implies, the ATMFIFO_2CELL block 443 comprises a two (ATM) cell-deep, first-in, first-out shift-register (FIFO). The two (ATM) cell depth of ATMFIFO_2CELL block 443 has been found to provide for transmission timing adjustment or bit-slip compensation, while reducing hardware complexity. The GENCELLS_ATM block 435 serially reads out the contents of the ATMFIFO_2CELL block 433 at a prescribed downstream data rate (N×32K bits per second), where N is based upon the data rate at which the downstream ADSL path from the DSLAM to the ALE-C is running.

In accordance with a preferred embodiment, this short haul ADSL data rate is one which has been optimized to conform with the transport capability of the long haul (extended range) SDSL link (and also accommodates an auxiliary (64K) POTS channel), using a DSLAM-'spoofing' mechanism of the type described in the above referenced '146 application. As described therein, the DSLAM spoofing scheme stores various data rate parameters that are used to adaptively optimize the short haul downstream data rate to one that conforms with the data rate for the SDSL loop. One of these is a RATE_LIMIT code, that is used to selectively overwrite a signal-to-noise ratio (SNR) value for the short haul link reported to the DSLAM by the ALE-C, in order to spoof the DSLAM into training the short haul ADSL link at a data rate lower than it is capable of supporting.

To ensure that the DSLAM will train at a data rate that is no higher than the data rate that can be supported by the SDSL link (and also providing an auxiliary (64K) POTS channel), the DSLAM-spoofing mechanism is initially supplied with a "TARGET" SDSL data rate for the SDSL loop. In a preferred embodiment, this TARGET SDSL data rate is derived by means of the SDSL autobaud mechanism of the present invention, to be described. The data rate to which the DSLAM is to train may be either a 'fixed' mode data rate, or a 'best efforts' mode data rate.

Fixed mode corresponds to the use of a non-adjustable data rate that has been predefined by the telecom service provider, and will typically correspond to some minimum data rate that has been guaranteed to the customer. There is no modification of this data rate, and it must conform with the TARGET SDSL data rate before data mode is enabled. Best efforts mode is used to spoof or induce the DSLAM to adjust its data rate until it conforms with the TARGET SDSL data rate. The minimum guaranteed data rate may range over a prescribed set of values, e.g., between 256K to 896K, at 128K increments. For a 512K×384K service subscription, the guaranteed downstream data rate is 512 Kbps and the upstream data rate is 384 Kbps. Thus, to guarantee the 512K downstream data rate (plus the 64K POTS channel), the SDSL link would have to support at least at 512K+64K or 576 Kbps.

When the ALE-C is to operate in fixed data rate mode, the RATE_LIMIT buffer is loaded with an "OVERWRITE DISABLE" code value (e.g., $FF_{HEX}$) that prevents overwriting the data rate that has been pre-established by the telecom service provider. The ALE-C then conducts an ADSL training sub-routine (used for both fixed rate and best efforts modes).

For best efforts mode, which is used to spoof the DSLAM to adapt to the lower SDSL rate, a 'calibration' training sequence is initially carried out. This calibration sequence allows the DSLAM to train at an initial data rate, that will subsequently reduce to a rate which conforms with the SDSL data rate. For this purpose, the RATE_LIMIT buffer is loaded with a prescribed digital code (e.g., $40_{HEX}$) representative of a starting data rate. The data rate associated with this RATE_LIMIT code may vary, depending upon operational parameters of a particular DSLAM vendor's equipment, and is expected to be relatively fast (e.g., in excess of 1 bps), given the relative short length of the ADSL short all link between the DSLAM and the ALE-C.

The calibration subroutine then conducts an ADSL rain. The "ACTUAL" data rate at which the ADSL link rained is stored in a "CALIBRATE" buffer. Following the calibration train, the difference between the value ($40_{HEX}$) in the RATE LIMIT buffer and the ACTUAL data rate code is loaded into a "max_down_adjust" buffer. This code difference corresponds to a maximum (MAX) offset between the data rate at which the DSLAM-to-ALE-C link was originally expected to train and the data rate at which this link actually trained. Due to the relatively short distance between the DSLAM and the ALE-C, the MAX difference code is usually a relatively small positive number. The initial code stored in the RATE_LIMIT buffer is then replaced with by the "TARGET" SDSL data rate.

The calibration routine then drops the ADSL link and executes a rate limit minimization sub-routine, wherein polarity of the contents of the max_down_adjust buffer is examined. If negative, it is inferred that the difference between the initial calibration data rate, at which the loop is expected to train, and the data rate at which it actually trained is relatively large. In this case, a determination is made as to whether adding the digital value currently stored in the RATE_LIMIT BUFFER (the TARGET SDSL data rate) to that stored in the max_down_adjust buffer will result in an underflow of the max_down_adjust buffer. If so, the sub-routine replaces the TARGET data rate code in the RATE_LIMIT buffer with a minimum (non-zero) value of '1'. Otherwise,the TARGET SDSL data rate code in the RATE_LIMIT buffer is increased by the contents of the max_down_adjust buffer. If the contents of the max_down_adjust buffer are positive, it is inferred that the data rate at which the loop has actually trained is relatively close to its expected value, and the sub-routine determines whether adding the contents of the RATE_LIMIT BUFFER to the max_down_adjust buffer will result in an overflow of the max_down_adjust buffer. If not, the TARGET SDSL data rate code in the RATE_LIMIT buffer is increased by the contents of the max_down_adjust buffer. Otherwise, the TARGET SDSL data rate associated code in the RATE_LIMIT buffer is replaced by an all one's value of $FF_{HEX}$ (that disables overwriting the SNR reported to the DSLAM, as pointed out above). The RATE_LIMIT buffer now contains one of a minimum (non-zero) digital code value ('1'), a digital code value ($FF_{HEX}$) that disables overwriting the SNR reported to the DSLAM, or an maximum-adjusted RATE-LIMIT code.

Next, the minimum data rate at which the DSLAM is to operate is set. For this purpose, a determination is made whether a minimum data rate guaranteed to the customer can be accommodated by the (TARGET) SDSL data rate. For this purpose, the minimum guaranteed data rate is compared with the difference between the TARGET SDSL rate (as stored in the TARGET register) and the (64 Kbps) data rate of the auxiliary POTS channel. As long as the difference between the TARGET SDSL rate and the (64 Kbps) data rate of the POTS channel is at least equal to or greater than the minimum guaranteed data rate, delivery of that minimum guaranteed data rate to the customer is assured. In this case, the difference between the TARGET SDSL rate and the (64 Kbps) data rate of the auxiliary POTS channel is stored as a "MINIMUM" data rate. On the other hand, if the difference between the TARGET SDSL rate and the (64 Kbps) POTS data rate is less than the minimum guaranteed data rate, the guaranteed minimum value is stored.

Next, an ADSL training sub-routine, which is carried out for both fixed rate and best efforts modes, is executed. A new ADSL train is conducted. For 'fixed' data rate mode, the RATE_LIMIT buffer will have been loaded with the value $FF_{HEX}$ that inhibits overwriting the data rate that has been pre-established by the telecom service provider. For 'best efforts' (variable) data rate mode, however, the calibration sequence will have resulted in the RATE_LIMIT buffer being loaded with one of a minimum (non-zero) digital code value ('1'), a digital code value ($FF_{HEX}$) that disables overwriting the SNR reported to the DSLAM, or an maximum-adjusted RATE-LIMIT code, The ACTUAL data rate value at which the ADSL link trains is then compared with the contents of the TARGET SDSL data rate. If the trained (ACTUAL) ADSL data rate is greater than the TARGET SDSL data rate, it is concluded that the SDSL link will not support the trained data rate. In this event, routine drops the ADSL link, and returns to 'fixed' or 'best effort ' data rate mode inquiry. For fixed mode, the ADSL training routine is reinitiated. For best efforts mode, the contents of the, max_down_adj register (which had been loaded with a digital code value representative of the difference between the value ($40_{HEX}$) and a digital code value representative of the data rate at which the ADSL link trained) are replaced with a code representative of the difference between the contents of the TARGET register and the ACTUAL data rate register. The routine then transitions back to the rate limit minimization sub-routine, described above.

If the SDSL link will support the (ACTUAL) data rate at which the ADSL loop is currently trained, the ACTUAL data rate is compared with the value of the MINIMUM data rate. If the MINIMUM data rate is greater than ACTUAL data rate, the routine drops the link, and proceeds as described above. If the ACTUAL data rate is greater than or equal to the MINIMUM data rate, the routine inquires whether the mode is 'best effort' or 'fixed rate'. If 'fixed rate' mode, DSLAM negotiation is complete.

For 'best efforts' mode, the contents of the ACTUAL register are compared with those of the CALIBRATE register (which contains data rate at which the loop trained during calibration). If the contents of the ACTUAL data rate register are the same as the contents of the CALIBRATE data rate register, the DSLAM negotiation is complete. However, if the contents of the. ACTUAL data rate register are different than the contents of the CALIBRATE data rate register, the contents of the ACTUAL data rate register are compared with the (SDSL data rate) contents of the TARGET data rate register. If the ACTUAL data rate is the same as the TARGET data rate, DSLAM negotiation is complete).

If the contents of the ACTUAL data rate register differ from those of the TARGET data rate register, it is determined whether this is the first time that MAX/MIN conditions have been met. If not, a flag is set indicating that the DSLAM has now met the MAX/MIN conditions, and the routine drops the ADSL loop and proceeds as described above. However, if the MAX/MIN conditions have been satisfied once before, DSLAM negotiation is complete.

Once DSLAM negotiation has been completed, the DSLAM's downstream data rate code stored in the ACTUAL data rate register (which has been determined to be sufficient to support the SDSL data rate and the auxiliary 64K POTS channel) is forwarded by the ALE-C to the ALE-R in the downstream site for training the customer's modem.

During downstream data mode, as the GENCELLS_ATM block 435 reads out the ATMFIFO_2CELL block 433, it controllably inserts idle ATM cells at a preselected rate (e.g., 8 Kbits per second, as shown in the downstream portion of the data rate transport diagram of FIG. 9) to make up for any timing difference between the ALE-C 120 and DSLAM 104. This controllably modified ATM cell data rate of N×32K+8K bits per second on the SDSL link 300 thus enables the timing (clocking) of the ALE-C 120 to be asynchronous to the DSLAM in the downstream direction. In the present example, the choice of an 8K bits per second as the idle cell insertion rate provides for DSLAM-ALE-C timing adjustment, while maintaining the SDSL baud rate at a value that will not substantially impair the range extension functionality of the TC-PAM encoding performed by the STU 423.

The GENCELLS_ATM block 435 then scrambles the resulting serial cell stream (containing both FIFO-extracted ATM cells and inserted idle ATM cells), and couples the resulting scrambled bit stream to the mux/demux 413, where the retimed and controllably modified ATM cell stream (now having a data rate of (N×32K+8K) bits per second) is combined with the encoded POTS data stream from the codec 412 for application to the STU 423 and TC-PAM based transmission over the SDSL link 300 to the customersite 200.

Before describing the operation of the upstream signal flow path through the ALE-C's ATM transceiver 422.C, the signal processing functionality of the downstream signal flow path through the customer site ATM transceiver 422-R (FIG. 6), to which the retimed and controllably modified ATM cell stream (having a data rate of (N×32K+8K) bits per second) within the serial data stream transmitted over the SDSL link 300 from the 'upstream' TC-PAM based transceiver 423 at the network site 100, will be described.

As shown in FIG. 6, similar to the network site's ATM transceiver 422-C, the downstream (here, 'from the SDSL loop') signal flow path through the customer site's ATM transceiver 422-R includes a cascaded arrangement of a CELLDELIN_ATM block 451, an ATMFIFO_2CELL block 453 and a GENCELLS_ATM block 455. In the 'to the SDSL link' or upstream direction, the signal flow path through the customer site ATM transceiver 422-R includes a similar cascaded arrangement of a CELLDELIN_ATM block 461, an ATMFIFO_2CELL block 463 and a GENCELLS_ATM block 465.

In the downstream path, the CELLDELIN_ATM block 451 is coupled to receive the serial DSLAM-originated ATM traffic, as transmitted downstream over the SDSL link 300 from the network site's STU 423 and TC-PAM demodulated by a complementary, customer site STU 423 in the ALE-R 220, which terminates the SDSL link 300. The (N×32K+8K) ATM stream as demultiplexed by the ALE-R's mux/demux 413 is coupled to the CELLDELIN_ATM block 451, which deframes the serial ATM cells coming from the upstream DSLAM 104, descrambles the deframed ATM cells and then writes them into ATMFIFO_2CELL block 453.

The GENCELLS_ATM block 455 controllably reads out the contents of the ATMFIFO_2CELL block 453 at the effective received ATM cell data rate (here N×32K+8K bits per second). In the course of reading out the contents of ATMFIFO_2CELL block 453, the GENCELLS_ATM block 455 controllably inserts additional idle ATM cells at a rate hat is compatible with the requirement that downstream DSL circuitry be able to train on 32K bit boundaries of ATM cell data.

For the N×32K+8K bits per second data rate of the received downstream ATM cell traffic in the present embodiment, this is readily accomplished at the GENCELLS_ATM block 455 by controllably inserting additional idle cells at 24K bits per second, to realize a total data rate of (N+1)×32K bits per second. It should be noted that since the higher idle cell insertion rate (24K) occurs at the downstream end of the SDSL link 300, it does not affect the SDSL baud rate and therefore will not impair the range extension functionality of TC-PAM encoding performed by upstream STU 423.

The GENCELLS_ATM block 455 of the ALE-R's ATM transceiver 422-R then scrambles the (N+1×32K serial ATM cell stream (containing both the ATM cells extracted from FIFO 453 and additionally inserted 24K idle ATM cells), and couples the resulting scrambled bit stream to the ATU 421 for application to the link 216 and delivery via downstream splitter 210 to the ADSL modem 204.

For the upstream path from the customer site 200 to the network site 100, the ALE-R's ATM transceiver 422-R includes a CELLDELIN_ATM block 461 coupled to receive customer modem-originated ATM traffic, as extracted by the ATU 421 from the composite FDM signal applied to the FDM port 401 from two-wire path 216. The CELLDELIN_ATM block 461 deframes the serial ATM cells coming from the customer modem 204, descrambles the deframed ATM cells and then writes them into the ATMFIFO_2CELL block 463.

As described previously, in the upstream path, the ALE-R's CELLDELIN_ATM operator 461 receives customer modem-originated ATM traffic, as extracted by the ATU 421 from the composite FDM signal applied to the FDM port 410 from the short haul path, deframes the serial ATM cells coming from the customer modem, and descrambles the deframed ATM cells. It then writes them into upstream ATMFIFO_2CELL FIFO 463 at the rate of the ADSL modem link.

If the DSLAM upstream data rate is less than or equal to the SDSL data rate, this modem link rate may be defined as having an effective upstream data rate of (M−1)×32 Kbps, where M is the DSLAM's upstream data rate, so that the ALE-R's upstream CELLDELIN_ATM operator 461 writes into the FIFO 463 at (M−1)×32 Kbps. If the DSLAM upstream data rate (M) is greater than the SDSL data rate (P), this modem link rate may be defined as having an upstream data rate of P×32 Kbps, and the CELLDELIN_ ATM operator 461 writes into the FIFO 463 at an effective upstream data rate of P×32 Kbps.

When reading out the contents of the ATMFIFO$_{13}$ 2CELL block 463, GENCELLS_ATM block 465 controllably inserts idle ATM cells at a preselected rate (e.g., 8 Kbits per second) to provide for any timing difference between the ALE-C 120 and DSLAM 104, as described above. Thus, where the DSLAM upstream data rate M is less than or equal to the SDSL data rate, the resultant effective data rate produced by the GENCEELS_ATM block 465 will be [(M−1)×32K]+8K bits per second. On the other hand, where the DSLAM upstream data rate M is greater than the SDSL data rate (P), the resultant effective data rate produced by the GENCELLS_ATM block 465 will be [P×32K]+8K bits per second.

The GENCELLS_ATM block 465 scrambles the resulting serial cell stream (containing both FIFO-extracted ATM cells and inserted idle ATM cells), and couples the resulting scrambled bit stream to the mux/demux 413 of the ALE-R 220, where the retimed and controllably modified ATM cell stream is combined with the encoded POTS data stream from the codec 412 for application to the customer site's STU 423 and TC-PAM based transmission over the SDSL link 300 to the network site 100.

In the upstream path of the ALE-C's ATM transceiver 422-C at the network site 100, CELLDELIN_ATM block 441 is coupled to receive the serial (upstream) modem-originated ATM traffic, as transmitted over the SDSL link 300 from the customer site, and TC-PAM demodulated by the network site's STU 423, which terminates the network end of SDSL link 300. The upstream ATM data stream (having a data rate of [(M−1)×32K]+8K or a data rate of (P×32K)+8K, depending upon the relationship between the DSLAM data rate M and the SDSL rate P, as described above) is demultiplexed by the ALE-C's mux/demux 413 and coupled to the CELLDELIN_ATM block 441. The CELLDELIN_ATM block 441 deframes the serial ATM cells coming from the downstream modem 204, descrambles the deframed ATM cells and writes them into the ATMFIFO_2CELL block 443.

The GENCELLS_ATM block 445 then controllably reads out the contents of the ATMFIFO_2CELL block 443 at the effective received ATM cell data rate and controllably inserts additional idle ATM cells at a rate that is compatible with the requirement that ADSL circuitry be able to train on 32K bit boundaries of the ATM cell data. For the (M−1)× 32K+8K bits per second data rate, this is readily accomplished by inserting additional idle cells at 24K bits per second, to realize a total data rate of M×32K bits per second. For the (P×32K)+8K bits per second data rate, this is accomplished by inserting additional idle cells so as to realize a total data rate of [(M−P−1)×32K]+24K or M×32K bits per second.

The M×32K bps serial ATM cell stream (containing both the ATM cells extracted from the FIFO 463 and additionally inserted idle ATM cells), is scrambled by the GENCELLS_ ATM block 445 and coupled to the ATU 421 for application as an ADSL signal over short haul loop 116 to DSLAM 104.

As pointed out above, the SDSL-implemented ADSL range-extending communication subsystem shown in FIG. 3 is capable of operating at a data rate up to the maximum data rate that can be supported by the two-wire SDSL link 300. The maximum data rate depends upon the distance between the two sites and the noise level on the SDSL two-wire pair. However, the actual data rate employed will not necessarily be the maximum data rate that can be supported by the SDSL link. For example, where the ADSL service subscription provides for a data rate (e.g., 768K bps) that is less than the maximum data rate (e.g., 1.024 Mbps), the actual data rate employed will be governed by the subscription data rate, as well as the need to accommodate the auxiliary 64K POTS channel.

SUMMARY OF THE INVENTION

The present invention is directed to a software-based, SDSL autobaud mechanism, that is executed by the data communications controllers of the respective network and customer ALEs, and which automatically resolves the maximum data rate that can be supported by the SDSL link, based upon signal power and signal quality measurements conducted over the link. Pursuant to the invention, the remote/customer (downstream) site's ALE-R causes the associated symmetric transceiver unit (STU-R) to apply a stimulus in the form of a transmission at a prescribed known power level on the SDSL link. At the central office (upstream) site, the power level received by the STU-C is measured by the ALE-C. Based upon a comparison of this received power level with the known power level at which the STU-R at the downstream site transmitted, the length of the SDSL line is estimated.

From this estimated distance, the ALE-C selects an initial, potentially acceptable baud rate to be employed for a data communication training session to be conducted between the two sites. Once it has selected a baud rate, the ALE-C transmits a 'data rate selection' message to the ALE-R, at a relatively low baud rate that will ensure error-free transmission. This data rate selection message identifies the initially selected baud rate to be used for the training session.

In response to receipt of the data rate selection message from the ALE-C, the ALE-R initiates an SDSL training session between the two sites. To this end, ALE-R transmits a prescribed training data sequence at the initially selected signaling rate. If the SDSL loop does not successfully train at the initially selected signaling rate, the ALE-C transmits a 'reduce baud rate and/or bits/baud' message to the ALE-R, at the relatively low baud rate that ensures error-free transmission. This reduce selection message identifies a lower baud rate and/or number of bits per baud be used for continuing the training session. In response to receipt of the reduce message from the ALE-C, the ALE-R transmits the training data sequence at the reduced signaling rate or lower number of bits/baud. This iterative process continues until the loop successfully trains.

Once the SDSL loop successfully trains, the signal quality is measured by the ALE-C to determine whether the baud rate at which the loop trained will run reliably with the existing noise on the link. If the signal quality measurement indicates a less than acceptable signal-to-noise ratio, the ALE-C transmits a further 'reduce baud rate and/or bits/baud' message to the ALE-R. In response to receipt of the further reduce message from the ALE-C, the ALE-R restarts the training data sequence, at a reduced number of bits/baud and/or baud rate. The iterative training process, described above, is again conducted until the loop successfully trains.

When the SDSL loop successfully trains, the signal quality is again measured by the ALE-C. If the signal quality measurement still indicates a less than acceptable signal-to-noise ratio, the ALE-C transmits another 'reduce baud rate and/or bits/baud' message to the ALE-R, and the process described above is repeated. This process is iteratively repeated until the signal quality measurement conducted by the ALE-C indicates an acceptable signal-to-noise ratio.

When the signal quality measurement conducted by the ALE-C indicates an acceptable signal-to-noise ratio, the ALE-C and ALE-R are placed in data mode. During data mode, the signal quality is continually monitored. Should the noise level on the SDSL link increase during data mode to a level that results in a less than acceptable signal quality, the ALE-C will transmit a 'reduce baud rate and/or bits/baud' message to the ALE-R, in response to which the ALE-R restarts the training data sequence, at a reduced number of bits/baud. The iterative training and signal quality measurement routine, described above, is again conducted until the loop successfully trains at an acceptable signal-to-noise ratio, at which time the ALE-C and ALE-R are again placed in data mode.

BRIEF DESCRIPTION OF THE DRAWINGS

FIG. 3 diagrammatically illustrates the general architecture of a hybrid SDSL-ADSL range-extending data/POTS communication arrangement disclosed in the above-referenced '707 application;

FIG. 4 shows the architecture of a ADSL Loop Extender (ALE) installed at each of the central office site and the customer site of the extended range ADSL communication scheme of FIG. 3;

DETAILED DESCRIPTION

Figure 1:
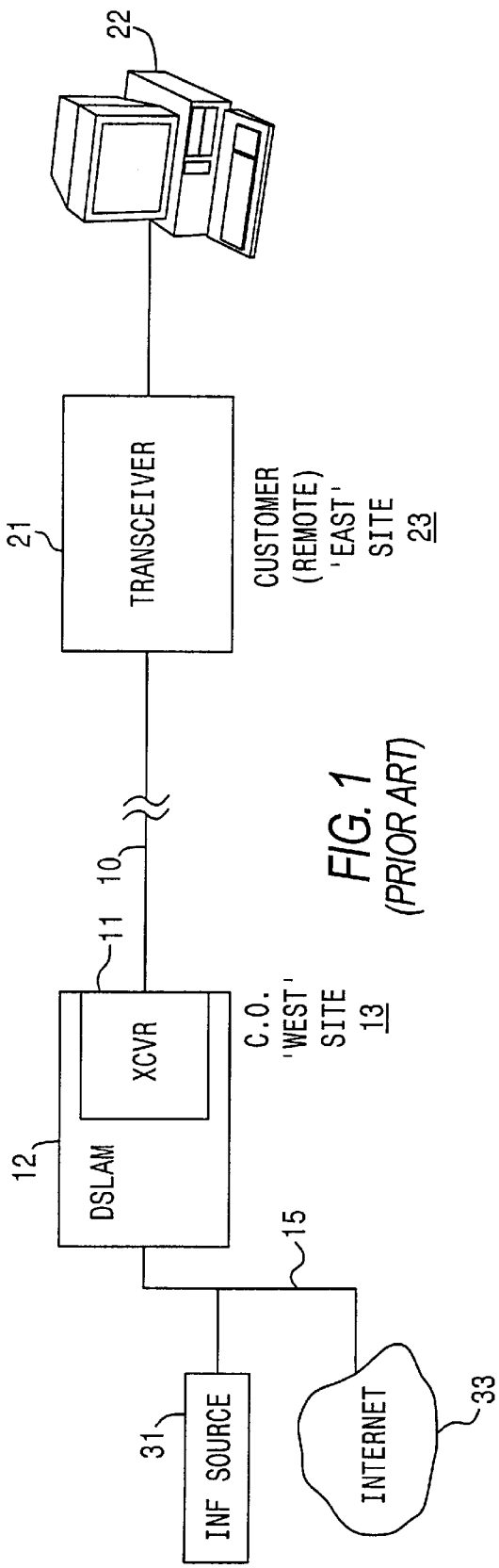
FIG. 1 diagrammatically illustrates the general architecture of a conventional DSL communication system.
Figure 2:
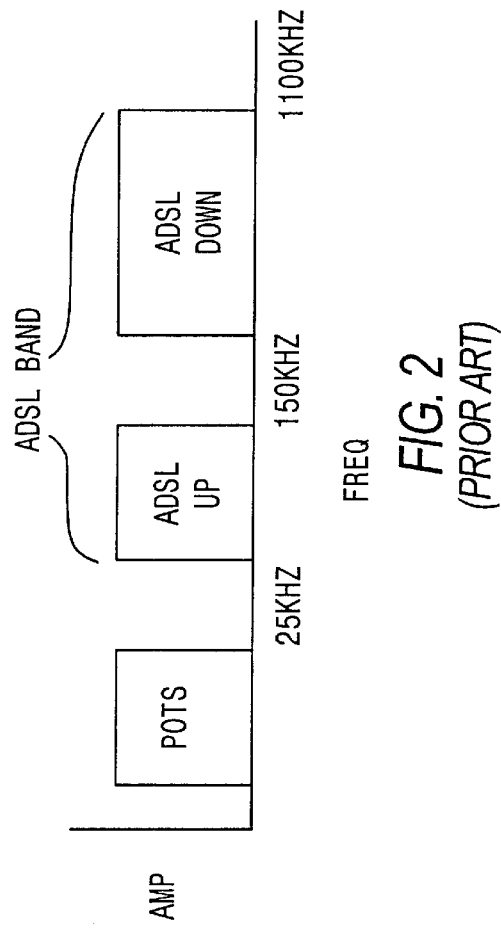
FIG. 2 shows the asymmetrical allocation of a high rate data ADSL band into a relatively larger sub-band portion for 'downstream' data transmissions from a central office site to a customer site, and a relatively smaller sub-band portion for 'upstream' data transmissions from a customer site to a central office site.
Figure 5:
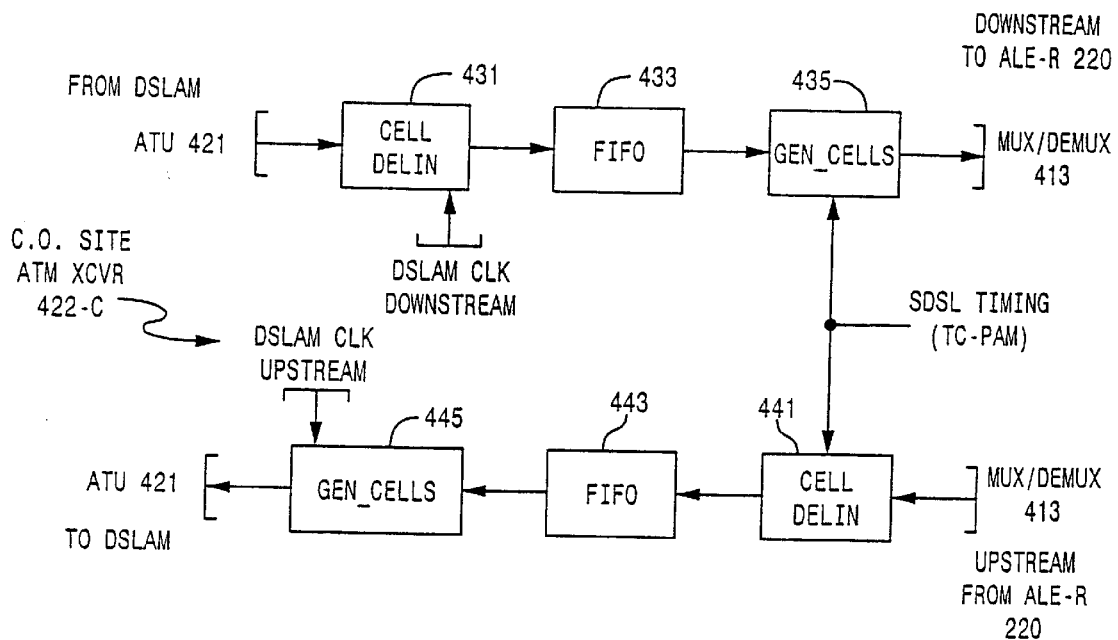
FIG. 5 shows the signal processing functionality of a network site ATM transceiver installed within an upstream ALE-C of the extended range ADSL communication scheme of FIG. 3.
Figure 6:
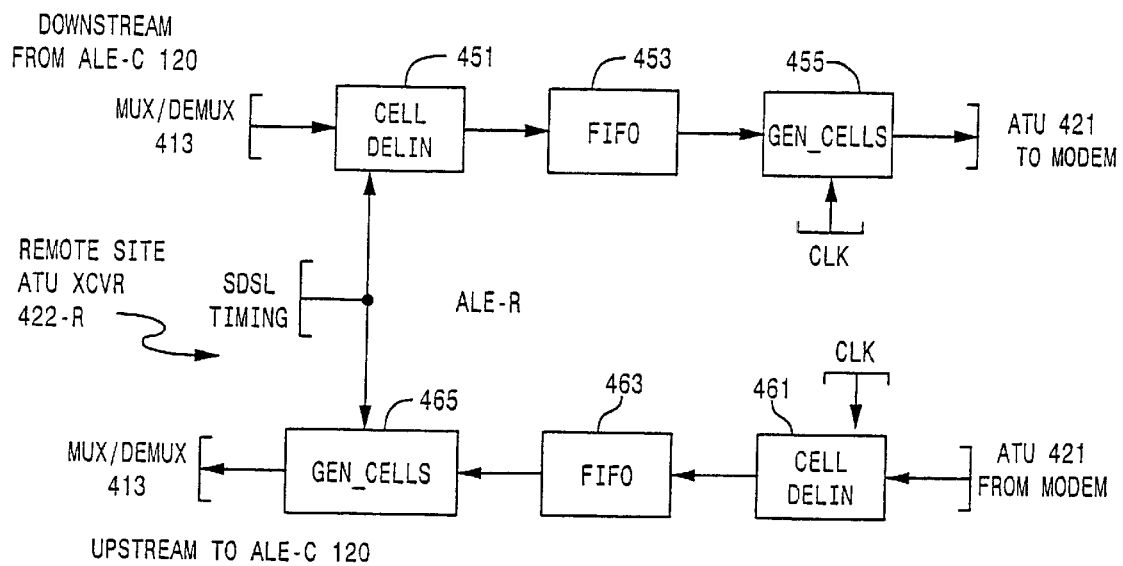
FIG. 6 shows the signal processing functionality of a customer premises site ATM transceiver of a downstream ALE-R at the downstream site of the extended range ADSL communication scheme of FIG. 3.

Before describing the SDSL autobaud mechanism according to the present invention, it should be observed that the invention resides primarily in a prescribed software routine, which is executable by upstream and downstream site-resident supervisory communications controllers, that control 'the' operation of telecommunication signaling components of a telecommunication system, such as that described in the above-identified '707 application. Consequently, the configuration of such a system has illustrated in the drawings by readily understandable block diagrams, showing only those specific details that are pertinent to the present invention, so as not to obscure the disclosure with details which will be readily apparent to those skilled in the art having the benefit of the description herein. The autobaud routine itself has been illustrated in a flow chart format, which is primarily,intended to show the various steps of the invention in a convenient functional sequence, whereby the present invention may be more readily understood.

For purposes of providing an illustrative embodiment, the following description will detail the use of the autobaud routine of the invention in the ADSL range extension system described in the '707 application. It should be understood, however, that the communication environment described herein is merely an example of one digital signal transport scheme to which the present invention may be applied and is not to be considered limitative of the invention.

Figure 7:
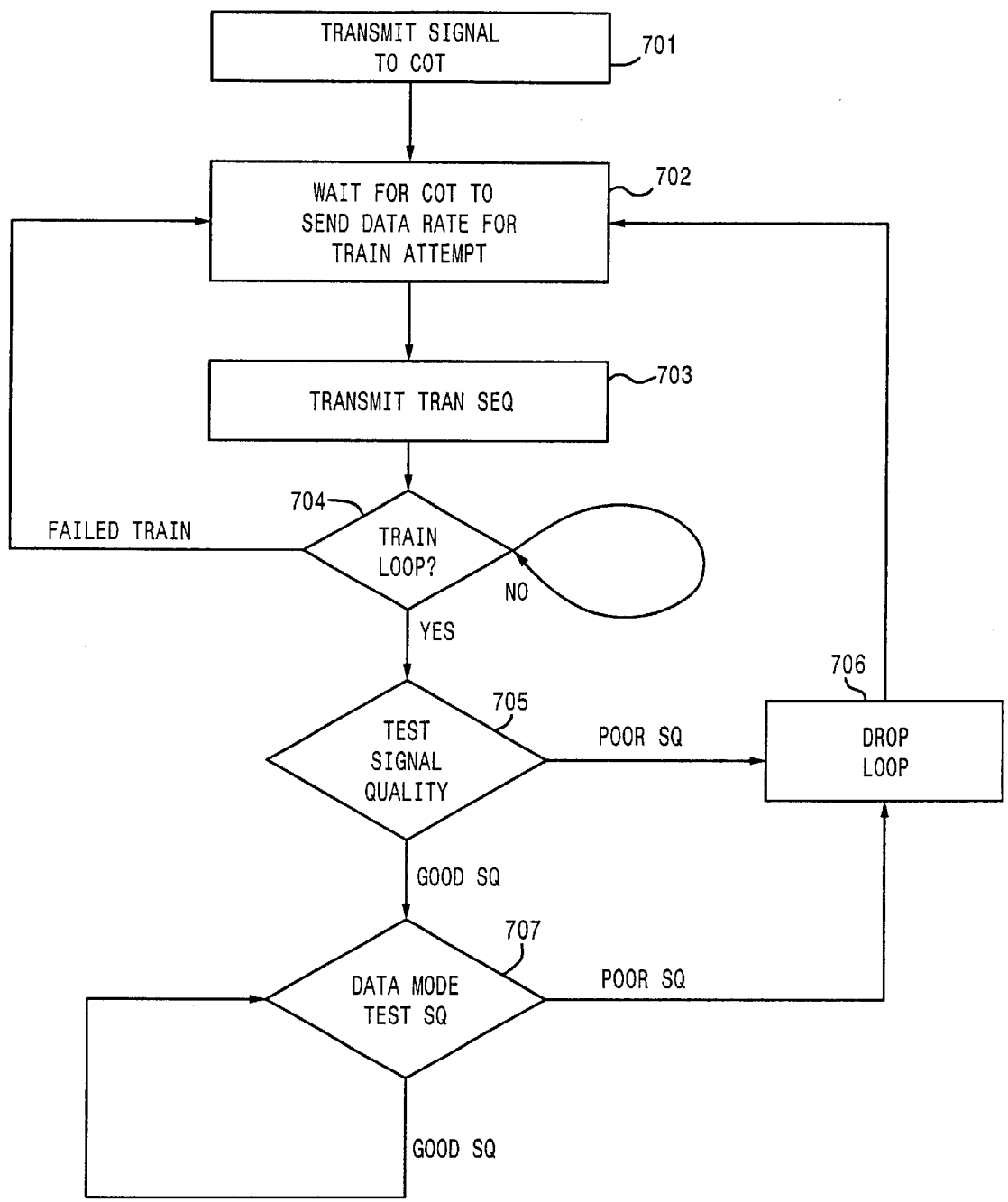
FIGS. 7 and 8 show respective steps of the SDSL autobaud mechanism according to the invention.
Figure 8:
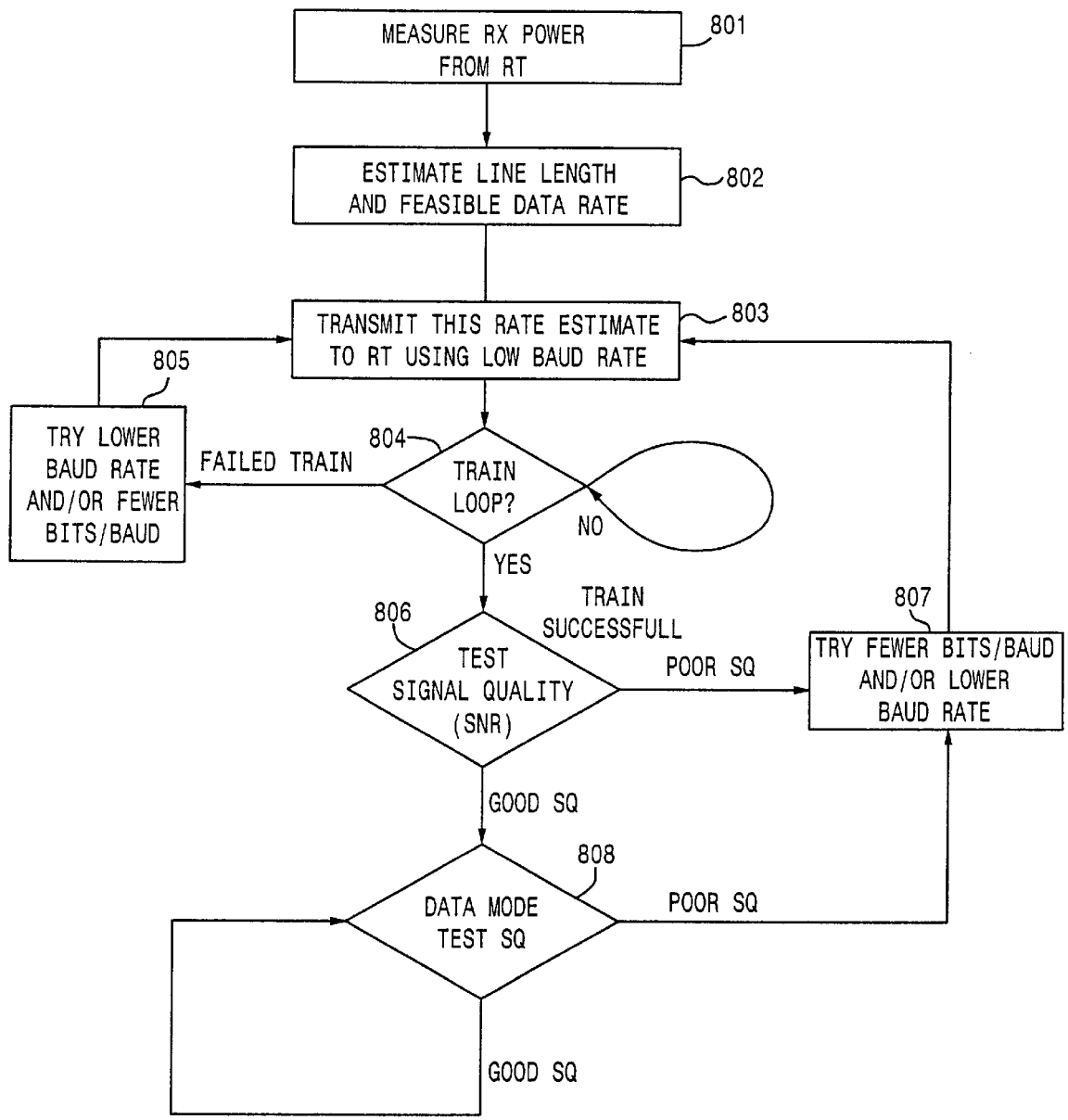
Figure 9:
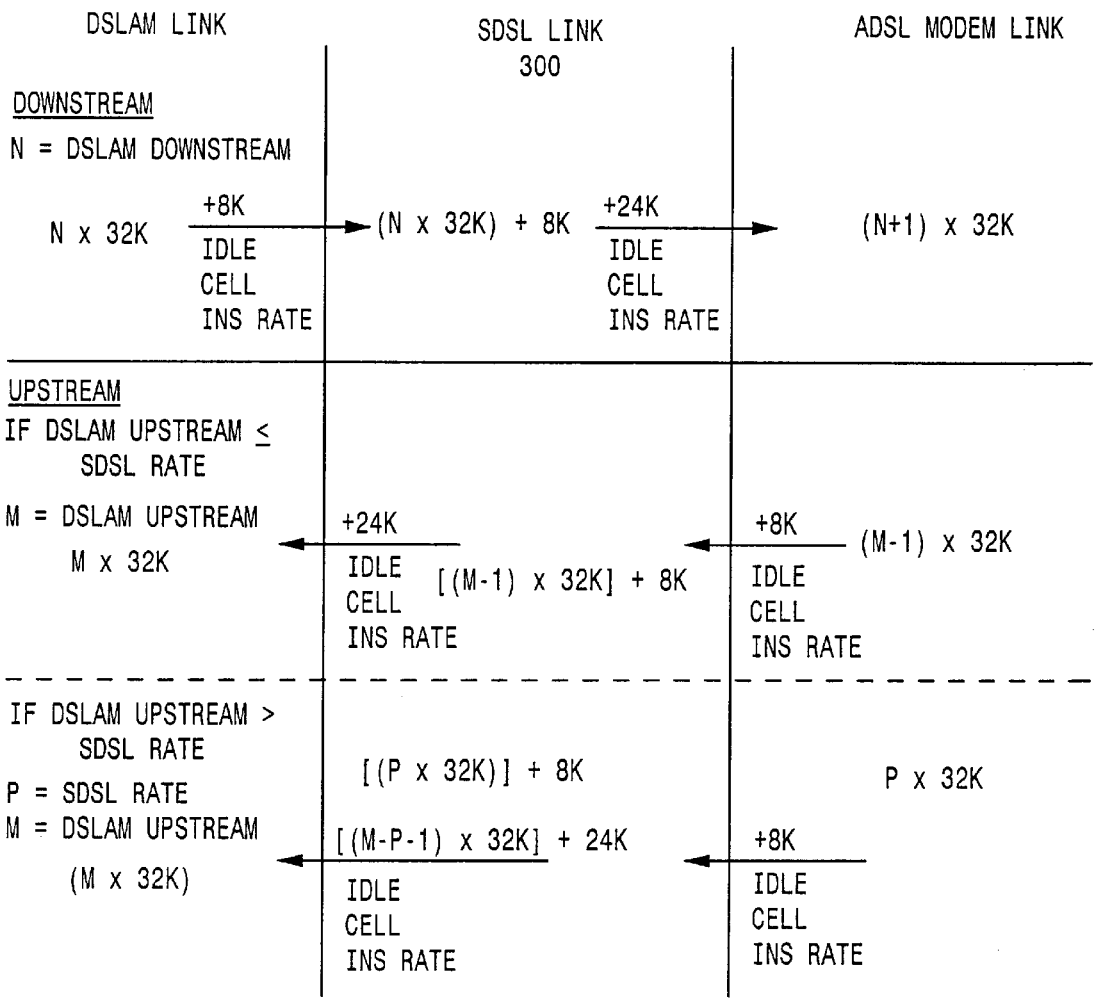
FIG. 9 is a data rate transport diagram showing downstream and upstream idle cell insertion data rates that may be employed in the ALE telecommunication system of FIG. 3.

Attention is now directed to FIGS. 7 and 8, which show the respective steps of the SDSL autobaud routine of the invention, as carried out by the supervisory microcontrollers of the ALE-R 220 and ALE-C 120 of the system of FIG. 3, described above. As pointed out previously, this SDSL autobaud mechanism is operative to automatically resolve the maximum data rate that can be supported by the SDSL link, in accordance with prescribed link parameter and signal quality measurements conducted between the upstream and downstream site.

As shown at step 701 of the ALE-R routine of FIG. 7, at power-up or reset, the (dowmstream) remote/customer site's ALE-R causes its associated symmetric transceiver unit (STU-R) to transmit a prescribed test signal at known power level over the SDSL link 300 to the upstream (central office) site 100. At step 801 of the ALE-C routine of FIG. 8, the power level received by the STU-C in the central office (upstream) site 100 is measured by the ALE-C. In step 802, based upon a comparison of this received power level with the known power level at which the STU-R at the downstream site transmitted, the length of the SDSL link 300 between the two sites 100 and 200 is estimated. In addition, the ALE-C uses this estimated distance to select an initial, potentially acceptable baud rate to be employed for a data communication training session to be conducted between the two sites. Each of these distance and baud rate estimates may be derived in a conventional manner, such as through look-up tables provided for the purpose.

Once it has selected a baud rate in step 802, the ALE-C routine transitions to step 803, and transmits a 'data rate selection' message to the ALE-R. This 'data rate selection' message is transmitted at a relatively low baud rate that will ensure error-free transmission. This data rate selection message identifies the initially selected baud rate selected in step 802 to be used for the training session between the two ALEs.

In step 702, the ALE-R receives the data rate selection message from the ALE-C. Next, in step 703, the ALE-R initiates an SDSL training session between the two sites. To this end, the ALE-R transmits a prescribed training data sequence at the initially selected signaling rate. If the SDSL loop does not successfully train at the initially selected signaling rate (the answer to 'train loop?' query step 704 in the ALE-R routine of FIG. 7 is NO), the ALE-R drops the loop and returns to step 702.

In parallel with the 'train loop?' query step 704 in the ALE-R, a NO answer to 'train loop?' query step 804 of the ALE-C routine of FIG. 8 causes the ALE-C to select a lower baud rate and/or number of bits/baud in step 805, and then transition back to step 803, wherein it again transmits a message identifying the lower baud rate and/or reduced number of bits/baud to the ALE-R at the downstream site (again at a relatively low baud rate that will ensure error-free transmission). In response to receipt of the reduced baud rate message from the ALE-C, the ALE-R transmits the training data sequence at the reduced baud rate in step 703. This iterative process continues until the loop successfully trains. Once the SDSL loop successfully trains (the answer to each of query steps 704 and 804 is YES), the routines transition to signal quality query steps 705 and 806.

In step 806, the signal quality of the training sequence received by the ALE-C is measured to determine whether the baud rate at which the loop has successfully trained will run reliably with the existing noise on the link. As a non-limiting example, signal quality may be defined in accordance with a prescribed signal-to-noise ratio (e.g., in terms of bit error rate (BER)).

If the signal quality measurement indicates a less than acceptable signal-to-noise ratio (the answer to query step 806 is NO), the ALE-C routine transitions to step 807, wherein it assembles a further 'reduce baud rate and/or number of bits/baud' message for transmission to the ALE-R. The ALE-C routine then transitions to step 803, wherein it again transmits the new reduce bits/baud, reduce baud rate message identifying the lower baud rate (or reduced number of bits per baud) to the ALE-R.

Similarly, in step 705 of the ALE-R routine, the signal quality of the training sequence received by the ALE-R is measured to determine whether the baud rate at which the loop has successfully trained will run reliably with the existing noise on the link. If the signal quality measurement indicates a less than acceptable signal-to-noise ratio (the answer to query step 705 is NO), the ALE-R routine transitions to step 706, wherein it drops the loop and returns to step 702.

In response to receipt of the reduce bits/baud message from the ALE-C, the ALE-R restarts the training data sequence in step 704, at a reduced number of bits/baud. The iterative training process, described above, is again conducted until the loop successfully trains (the answer to each of steps 704 and 804 is YES). Once the SDSL loop successfully trains, the signal quality is again measured. If the signal quality measurement still indicates a less than acceptable signal-to-noise ratio, the ALE-C transmits another 'reduce baud rate and/or number of bits/baud' message to the ALE-R in step 803, and the signal quality measurement steps described above are repeated. This process is iteratively repeated until the signal quality measurements indicate a n acceptable signal-to-noise ratio.

When the signal quality measurements indicate an acceptable signal-to-noise ratio (the answers to steps 705 and 806 are YES), the ALE-C and ALE-R are placed in data mode. When operating in data mode, the signal quality is continually monitored in query steps 707 and 808. Should the noise level on the SDSL link increase during data mode to a level that yields an unacceptable signal quality, the ALE-C will again transmit a 'reduce baud rate and/or number of bits/baud' message to the ALE-R, in response to which the ALE-R restarts the training data sequence, at a reduced baud rate and/or number of bits/baud, as described above. The iterative training and signal quality measurement routine is again conducted until the loop successfully trains at an acceptable signal-to-noise ratio, at which time the ALE-C and ALE-R are again, placed in data mode. Namely, even after the loop has trained, and the system is operating in data mode, the autobaud routine continues to monitor the signal quality and adjust the baud rate (and/or bits per baud) as necessary to maintain signal quality.

As will be appreciated from the foregoing description, the autobaud mechanism of the present invention enables (ALE) transceivers at opposite ends of the extended range SDSL loop to resolve the maximum data rate that can be supported by the SDSL loop, using signal power and quality measurements to first estimate the length of the SDSL loop and thereafter iteratively adjust baud rate and/or bits/per baud, as necessary, to realize an SDSL baud rate that will ensure error-free transmission over the long haul loop. The resulting SDSL baud rate may then be employed by the upstream ALE-C to control the short haul ADSL downstream data rate from the DSLAM, so that the DSLAM's downstream ADSL data rate conforms with the (lower) data rate of the long haul (extended range) SDSL link (and also accommodates an auxiliary (64K) POTS channel).

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. For use with a telecommunication network, a method of establishing the baud rate of data communications over a communication link between said first and second sites comprising the steps of:

(a) at said first site, applying a stimulus to said communication link;

(b) at said second site, estimating an initial baud rate to be employed for a data communication session between said first and second sites in accordance with a response of said communication link to said stimulus being applied thereto in step (a);

(c) conducting a link-training communication session between said first and second sites, beginning with said initial baud rate estimated in step (b), and proceeding through one or more lower baud rates, as necessary, until said communication link exhibits an acceptable performance at the baud rate employed;

(d) in response to said communication link exhibiting an acceptable performance in step (c), measuring signal quality of said communication link; and (e) in response to the signal quality measured in step (d) being at least a prescribed signal quality, establishing the baud rate realized in step (c) to be used for data communications between said first and second sites, and wherein step (a) comprises transmitting a predetermined signal over said communication link from said first site to said second site, and step (b) comprises measuring an attribute of said predetermined signal as received at said second site, and estimating said initial baud rate to be employed for a data communication session between said first and second sites in accordance with the measured attribute of said predetermined signal, step (b) comprises determining the length of said communication link between said first and second sites in accordance with the measured attribute of said predetermined signal as received at said second site, and estimating said initial baud rate to be employed for a data communication session between said first and second sites in accordance with the determined length of said communication link, step (c) comprises conducting a link-training communication session between said first and second sites, beginning with a first baud rate, and proceeding through one or more lower baud rates, as necessary, until said communication link exhibits an acceptable performance at the baud rate employed, and wherein step (e) comprises, in response to the signal quality measured in step (d) being at least said prescribed signal quality, establishing the baud rate to be used for data communications between said first and second sites as that for which said communication link exhibits an acceptable performance at the baud rate employed, step (e) further includes in response to the signal quality measured in step (d) being less than said prescribed signal quality, modifying an attribute of said baud rate, and repeating steps (c)–(d), as necessary, until the measured signal quality is at least said prescribed signal quality, and establishing the baud rate to be used for data communications between said first and second sites, as the baud rate at which at least said prescribed signal quality has been realized, and step (e) comprises, in response to the signal quality measured in step (d) being less than said prescribed signal quality, modifying the number of bits per baud and repeating steps (c)–(d), as necessary, until the measured signal quality is at least said prescribed signal quality, and establishing the baud rate to be used for data communications between said first and second sites, as the baud rate at which at least said prescribed signal quality has been realized.

2. The method according to claim 1, further including the step (f) of conducting a data communication session between said first and second sites at the baud rate established in step (e).

3. The method according to claim 2, wherein said communication link comprises a single-line digital subscriber line (SDSL) link, and wherein step (f) comprises conducting said data communication session by transporting asymmetric digital subscriber line (ADSL) and digital plain old telephone service (POTS) data signals over said SDSL link.

4. The method according to claim 1, wherein step (e) further includes, in response to the signal quality measured in step (d) being less than said prescribed signal quality, modifying an attribute of the baud rate, repeating steps (c)–(d), as necessary, until the measured signal quality is at least said prescribed signal quality, and establishing the baud rate to be used for data communications between said first and second sites, as the baud rate at which at least said prescribed signal quality has been realized.

5. The method according to claim 4, further including the step (f) of conducting a data communication session between said first and second sites at the baud rate established in step (e).

6. The method according to claim 1, wherein said communication link comprises a single-line digital subscriber line (SDSL).

7. The method according to claim 1, wherein step (e) further includes measuring signal quality of said communication link during said data communication session and in responsive to the signal quality measured during said data communication session being less than said prescribed signal quality, modifying an attribute of the baud rate and repeating steps (c)–(d), as necessary, until the measured signal quality is at least said prescribed signal quality, and establishing the baud rate for a communication session between said first and second sites as the baud rate exhibiting at least said prescribed signal quality.

8. The method according to claim 7, wherein step (e) comprises, in response to the signal quality measured during said data communication session being less than said prescribed signal quality, modifying the number of bits per baud and repeating steps (c)–(d), as necessary, until the measured signal quality is at least said prescribed signal quality, and conducting said data communication session at the baud rate and number of bits per baud exhibiting at least said prescribed signal quality.

9. For use with an asymmetrical digital subscriber line (ADSL) communication system, having an upstream transceiver coupled to an upstream ADSL communication device that provides access to one or more digital communication resources of a telecommunication network, said upstream transceiver being coupled over a communication link to a downstream transceiver, said downstream transceiver being coupled to a customer premises equipment ADSL communication device, a method of establishing a communication baud rate to be employed by said upstream and downstream transceivers for digital communications over said communication link, said method comprising the steps of:

(a) transmitting a signal from one of said upstream and downstream transceivers over said communication link to the other of said upstream and downstream transceivers;

(b) at said other transceiver, estimating an initial baud rate capable of being supported by said communication link in accordance with a property of said signal as received by said other receiver;

(c) conducting a link-training communication session between said one and other transceivers, beginning with said initial baud rate estimated in step (b), and proceeding through one or more lower baud rates, as necessary, until said communication link exhibits an acceptable performance at the signaling rate employed;

(d) in response to said communication link exhibiting an acceptable performance in step (c), measuring signal quality of said communication link; and (e) in response to the signal quality measured in step (d) being at least a prescribed signal quality, establishing the baud rate realized in step (c) to be used for data communications between said upstream and downstream transceivers, and wherein step (e) further includes, in response to the signal quality measured in step (d) being less than said prescribed signal quality, modifying the number of bits per baud and repeating steps (c)–(d), as necessary, until the measured signal quality is at least said prescribed signal quality, and establishing the baud rate to be used for data communications between said upstream and downstream transceivers, as the baud rate at which at least said prescribed signal quality has been realized.

10. The method according to claim 9, wherein step (b) comprises estimating the length of said communication link between said first and second sites in accordance with a measured attribute of said signal as received by said other transceiver, and estimating a baud rate supportable by said communication link in accordance with the estimated length of said communication link.

11. The method according to claim 9, wherein said communication link comprises a single-line digital subscriber line (SDSL) link, and further including the step (f) of transporting, over said SDSL link between said upstream and downstream transceivers, a digital data signal containing a composite of an asymmetric digital subscriber line (ADSL) channel and a digital plain old telephone service (POTS) channel, at the baud rate established in step (e).

12. The method according to claim 11, wherein said communication link comprises a single-line digital subscriber line (SDSL) link, said upstream transceiver is adapted to combine a downstream ADSL channel provided by an upstream ADSL communication device with a downstream digital plain old telephone system (POTS) channel into a composite downstream digital signal for transmission at said established baud rate over said communication link from an upstream site thereof, and wherein said downstream transceiver is coupled to a dowmstream site of said communication link that is remote with respect to said upstream site, and is adapted to receive said composite downstream digital signal transmitted over said communication link from said upstream transceiver at said established baud rate, and to extract from said composite downstream digital signal said downstream digital POTS channel for delivery to a downstream POTS device, and said downstream ADSL channel for delivery to a downstream ADSL communication device.

* * * * *

UNITED STATES PATENT AND TRADEMARK OFFICE
CERTIFICATE OF CORRECTION

PATENT NO. : 6,539,081 B1
DATED : March 25, 2003
INVENTOR(S) : Jon Thomas Zakrzewski et al.

It is certified that error appears in the above-identified patent and that said Letters Patent is hereby corrected as shown below:

Column 1,
Line 9, delete "in U.S." insert -- in co-pending U.S. --
Line 11, delete "707" insert -- '707 --
Line 15, delete "also U.S." insert -- also co-pending U.S. --
Line 59, delete "(PSTN), to deliver" insert -- (PSTN) to deliver --

Column 3,
Line 36, delete "1 Mbps over" insert -- 1 Mbps, over --
Line 44, delete "25 kft) Hence," insert -- 25kft). Hence, --
Line 51, delete "extending' scheme" insert -- extending scheme --

Column 4,
Line 57, delete "'ALR-R' 220," insert -- "'ALE-R' 220, --
Line 66, delete "ALE R-220" insert -- ALE-R 220 --

Column 6,
Line 15, delete "link', or" insert -- link' or --

Column 7,
Line 33, delete "1 bps)" insert -- 1 Mbps) --
Line 34, delete "all" insert -- haul --
Line 35, delete "rain" insert -- train --
Line 36, delete "rained" insert -- trained --
Lines 37-38, delete "RATE LIMIT" insert -- RATE_LIMIT --
Line 47, delete "replaced with by the " insert -- replaced by the --

Column 8,
Line 52, delete "of the, max_down_adj" insert -- of the max_down_adj --

Column 9,
Line 1, delete "'best effort'" insert -- 'best efforts' --
Line 9, delete "of the. ACTUAL" insert -- of the ACTUAL --
Lines 55-56, delete "customersite" insert -- customer site --
Line 58, delete "422.C," insert -- 422-C, --

Column 10,
Line 27, delete "hat" insert -- that --
Line 28, delete "DSL" insert -- ADSL --
Line 42, delete "(N+1x32K" insert -- (N+1)x32K --

UNITED STATES PATENT AND TRADEMARK OFFICE
CERTIFICATE OF CORRECTION

PATENT NO. : 6,539,081 B1
DATED : March 25, 2003
INVENTOR(S) : Jon Thomas Zakrzewski et al.

It is certified that error appears in the above-identified patent and that said Letters Patent is hereby corrected as shown below:

Column 11,
Line 11, delete "ATMFIFO$_{13}$2CELL" insert -- ATMFIFO_2CELL --
Line 18, delete "GENCEELS_ATM" insert -- GENCELLS_ATM --

Column 12,
Line 24, delete "dowmstream" insert -- downstream --
Line 51, delete "be" insert -- to be --

Column 13,
Line 38, delete "a" insert -- an --
Line 39, delete "site" insert -- sites --
Line 63, delete "'the'" insert -- the --

Column 14,
Line 6, delete "primarily, intended" insert -- primarily intended --
Line 28, delete "(dowmstream)" insert -- (downstream) --

Column 15,
Line 50, delete "a n" insert -- an --
Line 65, delete "again, placed" insert -- again placed --

Column 17,
Line 64, delete "responsive" insert -- response --
Line 66, delete "rate and" insert -- rate, and --

Signed and Sealed this

Nineteenth Day of August, 2003

JAMES E. ROGAN
*Director of the United States Patent and Trademark Office*